US009166969B2

(12) United States Patent
Hershberg et al.

(10) Patent No.: US 9,166,969 B2
(45) Date of Patent: Oct. 20, 2015

(54) SESSION CERTIFICATES

(71) Applicant: Cisco Technology, Inc., San Jose, CA (US)

(72) Inventors: Yehoshua Hershberg, Beit Shemesh (IL); Amir Naftali, Kiryat Ono (IL); Etti Shalev, Haifa (IL); Maya Felder, Kiryat-Ono (IL)

(73) Assignee: Cisco Technology, Inc., San Jose, CA (US)

( * ) Notice: Subject to any disclaimer, the term of this patent is extended or adjusted under 35 U.S.C. 154(b) by 202 days.

(21) Appl. No.: 13/706,398

(22) Filed: Dec. 6, 2012

(65) Prior Publication Data
US 2014/0165147 A1 Jun. 12, 2014

(51) Int. Cl.
H04L 29/06 (2006.01)
H04L 9/32 (2006.01)

(52) U.S. Cl.
CPC ............ *H04L 63/0823* (2013.01); *H04L 9/321* (2013.01); *H04L 63/083* (2013.01); *H04L 63/0892* (2013.01); *H04L 63/0807* (2013.01)

(58) Field of Classification Search
CPC .. H04L 63/0823; H04L 63/0807; H04L 9/321
USPC ............................................................ 726/4
See application file for complete search history.

(56) References Cited

U.S. PATENT DOCUMENTS

| 6,971,005 | B1* | 11/2005 | Henry et al. ................... 713/155 |
| 7,389,534 | B1* | 6/2008 | He ................................... 726/15 |
| 7,549,048 | B2* | 6/2009 | Freeman et al. .............. 713/171 |
| 7,653,809 | B2* | 1/2010 | Banks et al. .................. 713/155 |
| 8,214,884 | B2* | 7/2012 | Xia et al. ........................... 726/5 |
| 8,219,808 | B2* | 7/2012 | Belohoubek et al. ......... 713/168 |
| 8,316,424 | B2* | 11/2012 | Henry et al. ....................... 726/5 |
| 8,327,128 | B1* | 12/2012 | Prince et al. .................. 713/150 |
| 8,543,471 | B2* | 9/2013 | Salowey et al. ............ 705/26.41 |
| 8,611,537 | B2* | 12/2013 | Bhatt ............................ 380/270 |
| 8,739,258 | B2* | 5/2014 | Alnas et al. ....................... 726/7 |
| 2002/0159601 | A1* | 10/2002 | Bushmitch et al. ........... 380/277 |

(Continued)

OTHER PUBLICATIONS

The Lightweight Online Certificate Status Protocol (OCSP) Profile for High-Volume Environments; A. Deacon et al.; RFC 5019; Sep. 2007.*

(Continued)

*Primary Examiner* — James Turchen
(74) *Attorney, Agent, or Firm* — Parker Ibrahim & Berg LLC; James M. Behmke; Stephen D. LeBarron

(57) ABSTRACT

A client device requests permission from a network access device to access a network associated with the network access device. The client device sends credentials of a user associated with the client device for authenticating with the network access device. The client device receives from the network access device permission to access the network along with a session certificate and an associated key. The session certificate and the key are associated with the credentials of the user. The client device establishes a network session using the network based on receiving the permission. During the network session, the client device establishes a secure communications channel with a website. The client device authenticates the user to the website by sending the session certificate to the website over the secure communications channel. The client device then receives permission from the website to access contents of the website.

19 Claims, 6 Drawing Sheets

(56) References Cited

U.S. PATENT DOCUMENTS

| | | | |
|---|---|---|---|
| 2003/0079021 A1* | 4/2003 | Fan | 709/227 |
| 2004/0088567 A1* | 5/2004 | Lamotte | 713/200 |
| 2006/0195893 A1* | 8/2006 | Caceres et al. | 726/8 |
| 2008/0141313 A1* | 6/2008 | Kato et al. | 725/62 |
| 2009/0222657 A1* | 9/2009 | Bender et al. | 713/156 |
| 2009/0235069 A1* | 9/2009 | Sonnega et al. | 713/156 |
| 2010/0185849 A1* | 7/2010 | Rune et al. | 713/156 |
| 2011/0023091 A1* | 1/2011 | Lukach et al. | 726/4 |
| 2011/0078448 A1* | 3/2011 | Chow et al. | 713/175 |
| 2013/0252583 A1* | 9/2013 | Brown et al. | 455/411 |
| 2014/0068252 A1* | 3/2014 | Maruti et al. | 713/162 |

OTHER PUBLICATIONS

PKI Requirements for IPsec; Matti Jarvinen; Helsinki University of Technology; 2003.*

* cited by examiner

| User Credentials | Session Certificate | Certificate Expiry Time | Revoked |
|---|---|---|---|
| User A, Session 1 | Certificate_A1 | 2011-09-30 1600:01:23 | Y |
| User B | Certificate_B | 2011-09-30 1400:10:04 | N |
| ---- | ---- | ---- | ---- |
| User A, Session 2 | Certificate_A2 | 2011-09-30 2100:05:43 | N |

FIG. 3

SESSION CERTIFICATES

TECHNICAL FIELD

The following disclosure relates generally to establishing network sessions using session certificates.

BACKGROUND

A user visiting websites sometimes has to authenticate him or her to a website before being granted access to the contents of the website. For example, a bank website may require the user to enter a pre-registered login username and password combination to be granted access. Typically, the user authenticates separately to different websites.

BRIEF DESCRIPTION OF THE FIGURES

FIG. 3 illustrates an exemplary database of session certificates at an authentication, authorization and accounting (AAA) server.

DESCRIPTION OF EXAMPLE EMBODIMENTS

Overview

In a general aspect, a method for establishing network sessions using session certificates is implemented when a client device requests permission from a network access device to access a network associated with the network access device. The client device sends credentials of a user associated with the client device for authenticating with the network access device. The client device receives from the network access device permission to access the network along with a session certificate and an associated key. The session certificate and the key are associated with the credentials of the user. The client device establishes a network session using the network based on receiving the permission. During the network session, the client device establishes a secure communications channel with a website. The client device authenticates the user to the website by sending the session certificate to the website over the secure communications channel. The client device then receives permission from the website to access contents of the website.

The details of one or more aspects of the subject matter described in this specification are set forth in the accompanying drawings and the description below. Other potential features and aspects of the subject matter will become apparent from the description, the drawings, and the claims.

DETAILED DESCRIPTION OF EXAMPLE EMBODIMENTS

Figure 1:
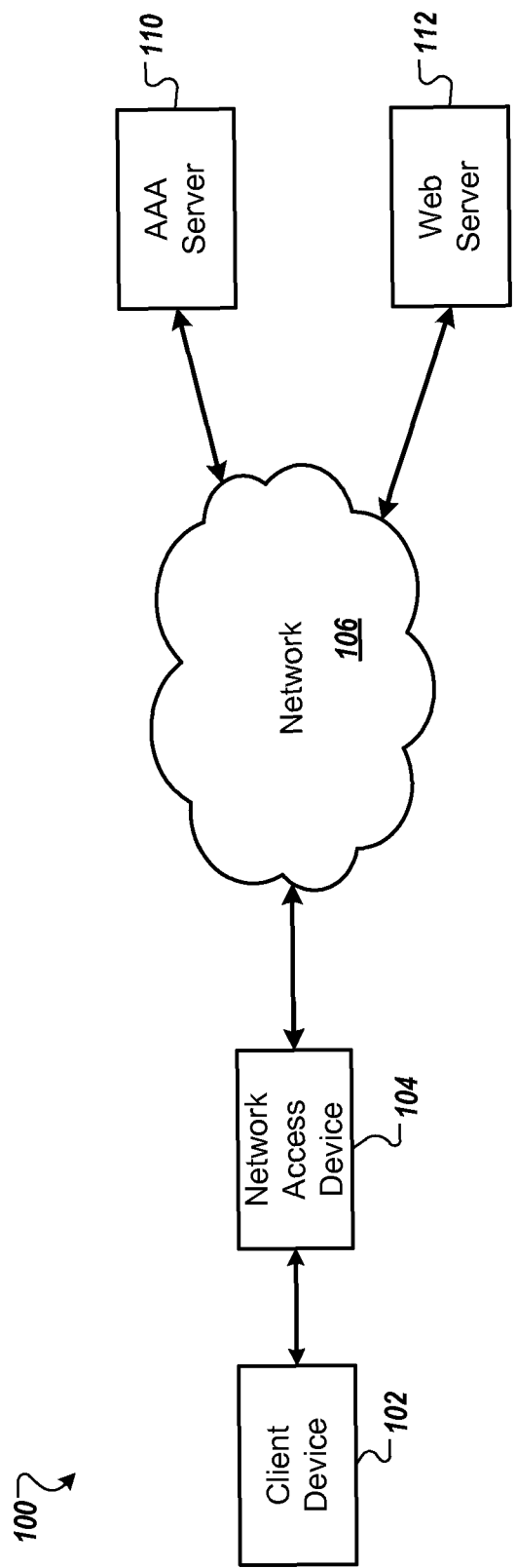
FIG. 1 illustrates an example of a system that may be used to enable access to websites using a session certificate.

FIG. 1 illustrates an example of a system 100 that may be used to enable access to websites using a session certificate. The system 100 includes a client device 102, which is communicatively coupled to a network 106 based on receiving permission from a network access device 104. An authentication, authorization and accounting (AAA) server 110 is associated with the network 106. The client device 102 can connect to a secure website hosted by a web server 112 via the network 106.

The client device 102 may be a tablet computer, a laptop computer, a desktop computer, a smart phone, an e-book reader, a music player, or any other appropriate portable or stationary computing device. The client device 102 may include one or more processors configured to execute instructions stored by a computer readable medium for performing various client operations, such as input/output, communication, data processing, and the like. The client device 102 includes one or more network interfaces through which it can establish wireless or wired connections to one or more networks, such as network 106. The client device 102 also runs applications, e.g., a web browser, using which the client device 102 can establish network sessions with various websites over the network 106.

The network access device 104 may be a router, an access point, a gateway server, a switch, or any other appropriate portable or stationary networking device. The network access device 104 may include one or more processors configured to execute instructions stored by a computer readable medium for performing various client operations, such as input/output, communication, data processing, and the like. The network access device 104 includes one or more network interfaces through which it can communicate with client devices, e.g., client device 102, and with the AAA server 110. The communication by the network access device 104 may be wired or wireless communication. The network access device 104 is configured for administering access to the network 106 by various client devices. The network access device 104 runs applications for verifying connection requests from client devices and monitoring and/or managing connections established over the network 106.

The network 106 may include a packet-switched data network, a circuit-switched data network, or any other network able to carry data, for example, Internet Protocol (IP)-based or asynchronous transfer mode (ATM)-based networks, including wired or wireless networks. The network 106 may be configured to handle web traffic such as hypertext transfer protocol (HTTP) traffic and hypertext markup language (HTML) traffic. The network 106 also may be configured to support security and control messages such as authentication using Extensible Authentication Protocol (EAP) methods over IEEE 802.11 (Wi-Fi), Online Certificate Status Protocol (OCSP) messages and Remote Authentication Dial In User Service (RADIUS) messages.

The network 106 may include the Internet, Wide Area Networks (WANs), Local Area Networks (LANs), analog or digital wired and wireless networks (e.g., Wi-Fi networks, wired Ethernet networks, Public Switched Telephone Network (PSTN), Integrated Services Digital Network (ISDN), and Digital Subscriber Line (xDSL)), Third Generation (3G) or Fourth Generation (4G) mobile telecommunications networks, private networks such as an intranet, radio, television, cable, satellite networks, and/or any other delivery or tunneling mechanism for carrying data, or any appropriate combination of such networks.

The AAA server 110 may be implemented on one or more servers that collectively perform authentication, authorization and accounting (AAA) functions for the network 106. The AAA server 110 includes one or more processors configured to execute instructions stored by a computer-readable medium for performing various operations, such as storing and managing credentials of registered users, and generating and managing session certificates for users. For example, the AAA server 110 may be implemented using the RADIUS protocol. In one implementation, the AAA server 110 is a Certificate Authority (CA) for the system 100 and it is recognized as the CA by network devices in the system 100. In such a case, network devices such as the client device 102, the network access device 104 and the web server 112 trust as valid session certificates and public/private key pairs that are disseminated by the AAA server 110.

In this context, a session certificate is a digital certificate issued to a user, e.g., user of client device 102, based on credentials of the user that have been registered with the AAA server 110 at some prior time. For example, the session certificate may be a X.509 certificate.

The session certificate is attached to the identity of the user and is generated by the AAA server 110 based on a request by the network access device 104, as described in the following sections. A public/private key pair unique to the user is generated by the AAA server 110 and associated with the session certificate. The key pair and session certificate may be unique to the particular network session during which the key pair and session certificate are generated, such that the same user may get different key pairs and session certificates for network connections to the network 106 that are established at different times.

The user may use the session certificate and public/private key pair for authenticating himself/herself to various network entities, e.g., web server 112, when connecting securely to the network entities. Therefore, the session certificate may be used as proof of the fact that the user has performed authentication with the AAA server 110. In some implementations, the user also may use the session certificate and public/private key pair for encrypting and/or authenticating messages that the user securely exchanges with other network entities.

The session certificate is valid, i.e., may be used for authentication and/or encryption, for a pre-determined amount of time, which is indicated in the session certificate. The pre-determined amount of time may be a few hours (such that the session certificate is short-lived), or it may be a few days or months, or some other suitable time period. The pre-determined amount of time is also known as the certificate expiry time, or certificate validity time, or simply as validity time.

In some implementations, the validity period of the session certificate may be tied to a network session associated with the client device during which the session certificate is generated. When the network session ends, the session certificate is marked as not valid. The network access device 104 monitors the network session established by the client device and periodically sends accounting messages to the AAA server 110 to update the server about the status of the network session. The AAA server 110 stores information on session certificates that it has issued. Based on the accounting messages received from the network access device 104, the AAA server 110 updates information on the validity of the session certificates stored in its database. The AAA server 110 marks a session certificate as not valid if the network session is terminated, or the validity period expires, whichever is earlier, or if the session certificate is revoked, i.e., rendered not valid, by the AAA server 110 based on some other reason.

In other implementations, the validity period of a session certificate may not be tied to the network session during which the session certificate is generated. In such cases, the session certificate may be valid till the validity period expires, or if the session certificate is revoked by the AAA server 110 based on some other reason.

Authentication refers to the process where a user's identity is authenticated, typically by providing evidence that it holds a specific digital identity such as an identifier, e.g., a login username, and the corresponding credentials, e.g., a login password, one-time token and digital certificates.

The authorization function determines whether a user is authorized to perform a given activity, e.g., access the resources of network 106. Authorization is typically based on authentication of the user when logging on to an application or service. Authorization may be determined based on a range of restrictions, for example time-of-day restrictions, or physical location restrictions, or restrictions against multiple accesses by the same entity or user.

Accounting refers to the tracking of resource consumption by users for the purposes of security, capacity and trend analysis, cost allocation and billing, among others. Accounting may record events such as authentication and authorization failures, and include auditing functionality, which permits verifying the correctness of procedures carried out based on accounting data. For example, as part of accounting procedures, the AAA server 110 server may gather information on the identity of the user of client device 102, connection to network 106 by client device 102, when the connection to network 106 was established and/or terminated, and if there is a status to report.

The web server 112 is a server that is configured to host a website accessible by client devices via the network 106. Although only one web server 112 is shown in FIG. 1, the system 100 may include a plurality of web servers that are accessible by client devices via the network 106. Client devices, such as client device 102, may access the website hosted by web server 112 by establishing a HTTP connection via the network 106. In some implementations, the web server 112 permits only secure connections from client devices for accessing the website hosted by the web server 112. In such cases, a client device accesses the website hosted by web server 112 by establishing a secure HTTP (HTTPS) connection via the network 106 using, for example, the Secure Socket Layer (SSL) protocol or the Transport Layer Security (TLS) protocol.

In general, the network 106 may be configured such that client devices that are granted permission by the network access device 104 may connect to the network 106. When a user of the client device 102 wants to connect to the network 106, e.g., to surf the Internet, the client device 102 sends a connection request to the network access device 104 in order to be allowed to connect to the network 106. As part of sending the connection request, the client device 102 may prompt the user to enter credentials that may be used for verifying the identity of the user, e.g., login username and password that have been registered with the AAA server 110 and/or the network access device 104. Alternatively, upon receiving the connection request, the network access device 104 may ask for credentials from the client device 102 to allow access to the network 106. For example, the network access device 104 may be a Wi-Fi access point and may allow connections to the network 106 using IEEE 802.11 protocol and an EAP method that establishes a secure tunnel, such as EAP-Flexible Authentication via Secure Tunneling (EAP-FAST), Protected EAP (PEAP) or EAP-Tunneled Transport Layer Security (EAP-TTLS).

Upon being prompted by the client device 102, the user enters his/her credentials on the client device 102. The client device 102 sends the user credentials to the network access device 104, which verifies the user based on the credentials. Upon verifying the credentials of the user as being accurate, the network access device 104 forwards the credentials to the AAA server 110 for generating a session certificate for the client device 102. The AAA server 110 determines that the network access device 104 has already verified the credentials of the user of client device 102 and it generates a session certificate for the user that is tied to the credentials sent by the network access device 104. As part of generating the session certificate, the AAA server 110 generates a public/private key pair, e.g., using the RSA algorithm, and ties the key pair to the session certificate.

In a different implementation, the network access device 104 does not verify the credentials of the user that it receives from client device 102. Instead, the network access device 104 sends the credentials to the AAA server 110, which performs the verification based on information that is stored in its database. If the AAA server 110 determines that the credentials are accurate, then the AAA server 110 generates the session certificate as described above.

Once the session certificate is generated, the AAA server 110 sends the session certificate and the key pair to the network access device 104. The network access device 104 sends a message to the client device 102 granting permission to access the network 106, along with the session certificate and the key pair. The client device 102 stores the session certificate and key pair in local memory and connects to the network 106, that is, the resources in the network 106 allow the client device 102 to establish network sessions using the resources. In addition, in one implementation the client device 102 makes the session certificate and key pair available to a web browser running on the client device 102. The session certificate and key pair is made available to the web browser through a provisioning application programming interface (API) or file update. In another implementation, the client device 102 does not proactively provide the session certificate and key pair to the web browser. The web browser queries the client device 102 for the session certificate and key pair during SSL or TLS negotiation while establishing a HTTPS connection with a website. Upon receiving the web browser query, the client device 102 makes the session certificate and key pair available to the web browser through an API.

The provisioning, i.e., generation and distribution, of the session certificate may take place over a secure EAP tunnel as part of the EAP-over-local area network (LAN) authentication. As described above, the EAP-over-LAN authentication is used for verifying that the user of client device 102 is authorized to access the network 106.

Once a network connection to network 106 is established by the client device 102, the user of client device 102 may visit various websites, e.g., using the web browser on client device 102. For example, the user of client device 102 visits the website hosted by web server 112. The web server 112 requires a secure connection and the web browser on client device 102 establishes a HTTPS connection to the web server 112. As part of the SSL handshake for establishing the HTTPS connection, the client device 102 sends the session certificate to the web server 112 to authenticate the user.

The web server 112 determines from the session certificate that the AAA server 110 is the CA who generated the session certificate. The web server 112 communicates with the AAA server 110, e.g., over the network 106, to verify the session certificate. For example, the session certificate may be a X.509 certificate and the web server 112 queries the AAA server 110 using OCSP messages to validate the session certificate.

The AAA server 110 tracks the connection of the client device 102 to the network 106, e.g., using RADIUS accounting messages that are sent by the network access device 104. Based on the information in the messages from the network access device 104, the AAA server 110 determines whether the connection currently exists. If the connection exists and/or the validity period of the session certificate has not expired, the AAA server 110 responds to the web server 112 query with information that the session certificate is valid. On the other hand, if the connection of the client device 102 to the network 106 is terminated, and/or the validity period of the session certificate has expired, the AAA server 110 updates the information its database marking the session certificate as expired or invalid. The AAA server 110 responds to the web server 112 query with information that the session certificate is not valid.

If the response from the AAA server 110 informs the web server 112 that the session certificate is valid, the web server 112 accepts the session certificate as verification of the identity of the user of client device 102. Consequently the web server 112 allows user of client device 102 to access the website over the HTTPS connection. On the other hand, if the response from the AAA server 110 informs the web server 112 that the session certificate is not valid, the web server 112 rejects the session certificate from the client device 102. In one implementation, when the web server 112 rejects the session certificate from the client device 102, the web server 112 proceeds to verify the user based on an alternative mechanism, e.g., web authentication using a login username/password combination. In another implementation, upon rejecting the session certificate from the client device 102, the web server 112 refuses the connection from the client device 102 to access the website.

The user may attempt to connect to multiple websites hosted on different web servers via the connection that is established over network 106 by client device 102 as described above. For one or more of the connections to the different web servers, the user may be authenticated to the web servers using the session certificate. Therefore, the user is not required to authenticate multiple times to multiple web servers. This may improve the ease of access to different websites and thus be convenient to the user.

In addition, authenticating the user using the session certificate that is tied to the identity of the user as known to the CA (that is, the AAA server 110) adds an extra layer of security for establishing secure connections to web servers. For example, SSL or TLS handshakes that are used in HTTPS connection establishment typically use server-side certificates tied to the web server. By introducing session certificates associated with the user as part of the SSL or TLS handshake, this may prevent man-in-the-middle attacks.

Figure 2:
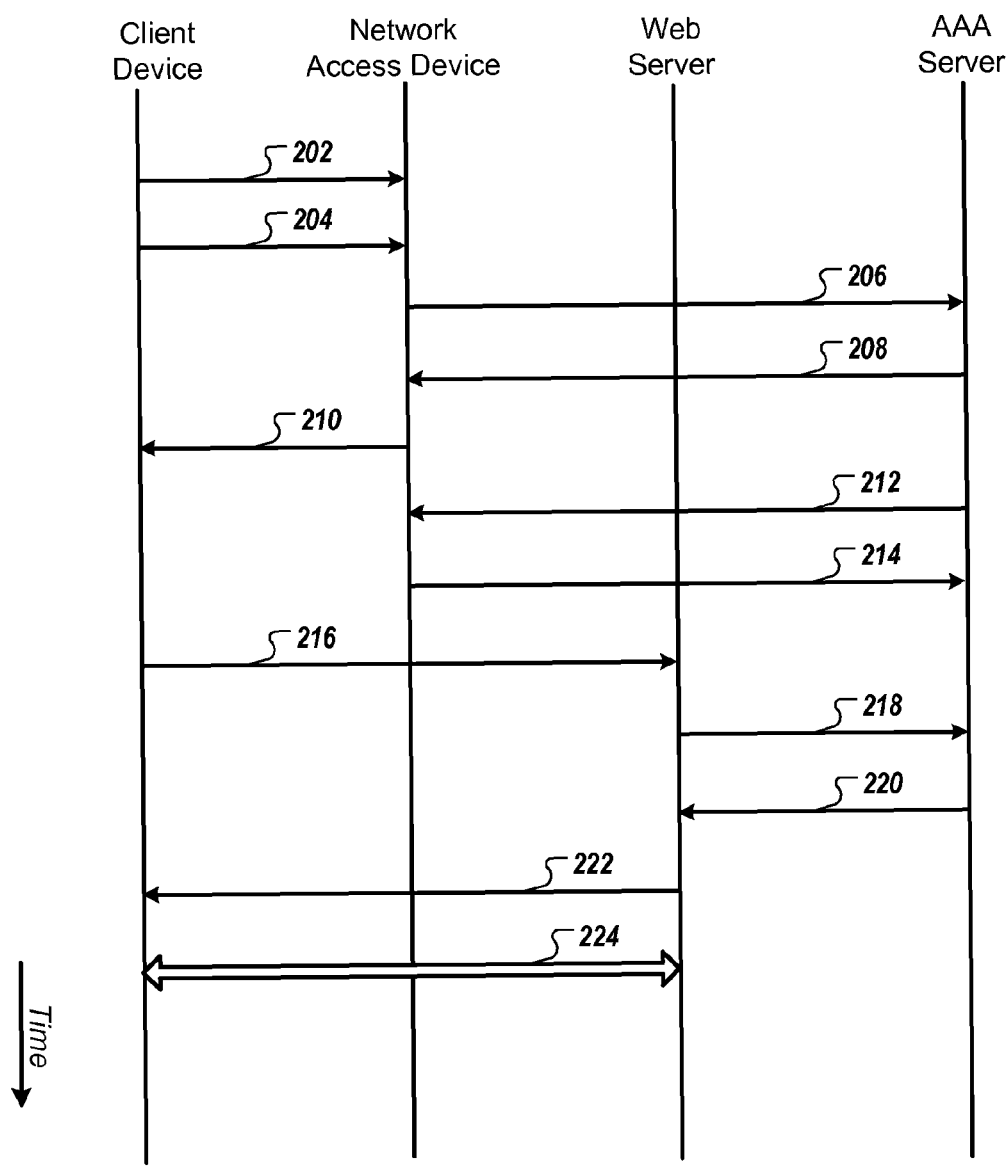
FIG. 2 illustrates a time sequence diagram of an exemplary flow of messages for enabling access to a website using a session certificate.

FIG. 2 illustrates a time sequence diagram of an exemplary flow of messages 200 for enabling access to a website using a session certificate. The flow of messages 200 may be performed by entities of the system 100, such as the client device 102, the network access device 104, the AAA server 110 and the web server 112. The following describes the flow of messages 200 as being performed by components of the system 100. However, the flow of messages 200 may be performed by other systems or system configurations.

The flow of messages 200 is initiated when the client device 102 sends a request 202 to the network access device 104 to access the network 106. For example, the user of the client device 102 may want to visit a website hosted by web server 112. Along with the request 202, the client device 102 sends the credentials of the user to the network access device 104. The credentials may be sent in a separate message 204, or as part of the request 202.

The network access device 104 verifies the credentials of the user received from the client device 102. Upon verifying the credentials, the network access device 104 sends the credentials to the AAA server 110 in a message 206 for generating the session certificate. As discussed previously, in an alternative implementation the network access device 104 does not verify the credentials. Instead, it sends the credentials to the AAA server 110 in message 206 for both verification and generating the session certificate.

The AAA server 110 generates the public/private key pair and the associated session certificate for the user of the client device 102. The AAA server 110 sends the key pair and the session certificate to the network access device 104 in a message 208. The network access device 104 forwards the session certificate and the key pair to the client device 102 in message 210. Upon receiving the message 210, the client device 102 is able to connect to the network 106.

The exchange of messages 202, 204 and 210 may take place in a secure method, e.g., using a secure EAP tunnel as part of an EAP-over-LAN authentication for the client device 102. The exchange of messages 206 and 208 also may take place over a secure connection established between the network access device 104 and the AAA server 110.

The AAA server 110 periodically sends query messages 212 to the network access device 104. The query messages 212 seek information on the status of the network connection from the client device 102 to the network 106. The network access device 104 sends response message 214 with information on the status of the network connection. In some implementations, the query message 212 is not sent. Instead, the network access device 104 periodically sends update messages 214, e.g., RADIUS accounting messages, to the AAA server 110 with information on the status of the network connection from the client device 102 to the network 106. Based on the information provided by the network access device 104, the AAA server 110 maintains updated information in its database on the validity of the session certificate for the user of the client device 102.

The web browser on client device 102 sends a secure connection request message 216 to the web server 112 when the user attempts to visit the website hosted by web server 112. As part of the handshake for establishing the secure connection, the client device 102 sends the session certificate to the web server 112.

The web server 112 sends a query message 218, e.g., an OCSP query message, to the AAA server 110 to determine the revocation status, i.e., the validity, of the session certificate. The query message 218 may include the session certificate as part of the message.

The AAA server 110 looks up the validity of the session certificate in its database and sends a reply message 220 to the web server 112 with information on whether the session certificate is valid or whether it is not valid, e.g., the session certificate has expired, or been revoked.

If the session certificate is valid, the web server 112 sends an acceptance message 222 to the client device 102 indicating that it accepts the session certificate as verified proof of the identity of the user of client device 102. Along with sending the acceptance message 222, the web server 112 allows the web browser on client device 102 to access the contents of the website hosted by the web server 112. However, if the reply message from the AAA server 110 informs that the session certificate is not valid, then the web server 112 rejects the session certificate and sends message 222 to the client device 102 informing the web browser accordingly. In addition, the message 222 may include a request from the web server 112 to the web browser to provide additional verification information for the user, e.g., login username and password for web authentication.

If the secure connection is established between the client device 102 and the web server 112, the user can access the content of the website hosted by the web server 112. Consequently, an exchange of data 224 between the web browser on client device 102 and the web server 112 takes place over the secure connection.

FIG. 3 illustrates an exemplary database 300 of session certificates at an authentication, authorization and accounting (AAA) server. The database 300 may be implemented, for example, in the AAA server 110. The following describes the database 300 as being implemented and used by components of the system 100. However, the database 300 also may be implemented and used by other systems or system configurations.

The database 300 may be implemented as a table that includes users registered with the AAA server 110 and session certificates that have been generated for the users. The table may have multiple rows 302, 304, 306 and multiple columns 308, 310 and 312. Each row of the table has an entry corresponding to the credentials of a user and an associated network session. For example, a row entry may correspond to the user of client device 102 and for a network connection established by the client device 102 with the network 106. Each row entry is associated with a unique session certificate. There may be multiple rows, corresponding to multiple entries, for the same user with the same credentials, but for different network sessions. The different row entries for the same user are associated with different session certificates. For example, user A is associated with rows 302 and 306 of the table, with row 302 being for session 1, while row 306 is for session 2. Row 302 is associated with session certificate certificate_A1, while row 306 is associated with certificate_A2, which is different from certificate_A1.

For each row of the database 300, there are four columns. The first column 308 stores the user credentials. For a user with multiple rows in the database 300, the first column 308 also stores the corresponding network session. This may be useful to differentiate between the network sessions as each row entry corresponds to a different network session established by the user. However, for a user with one entry in the database, the column 308 may not include the corresponding network session. For example, column 308 stores user credentials and session information <user A, session 1> for row entry 302 and <user A, session 2> for row entry 306 as both entries are for the same user. On the other hand, for row entry 304, column 308 stores user credentials user B and no session information as user B is associated with a single network session.

In an alternative implementation, the first column 308 in every row entry in the database 300 includes both the user credentials and session information. In this case, column 308 for row entry 304 stores the session information along with the user credentials user B, even if user B is associated with a single network session.

The second column 310 stores the session certificate associated with the particular user credentials and network session. The session certificates are different for each row entry, even if the user is the same, as described previously.

The third column 312 stores the certificate expiry time or validity period of the session certificate associated with the entry. If the certificate expiry time of the associated session certificate is a time that is in the past compared to the present time, then the session certificate has expired.

The fourth column 314 stores information on whether the session certificate associated with the row entry has been revoked. For example, if a network session has been terminated, the corresponding session certificate may be revoked, even if the validity period has not expired. If a session certificate is revoked, the corresponding entry in column 314 says "Y", while if a session certificate is not revoked, the corresponding entry in column 314 says "N". The AAA server 110 can update the entry in column 314 based on the accounting messages it receives from the network access device 104. By checking the entries in the columns 312 and 314, the AAA server 110 can determine whether a session certificate is invalid, i.e., whether it has expired or been revoked.

Figure 4:
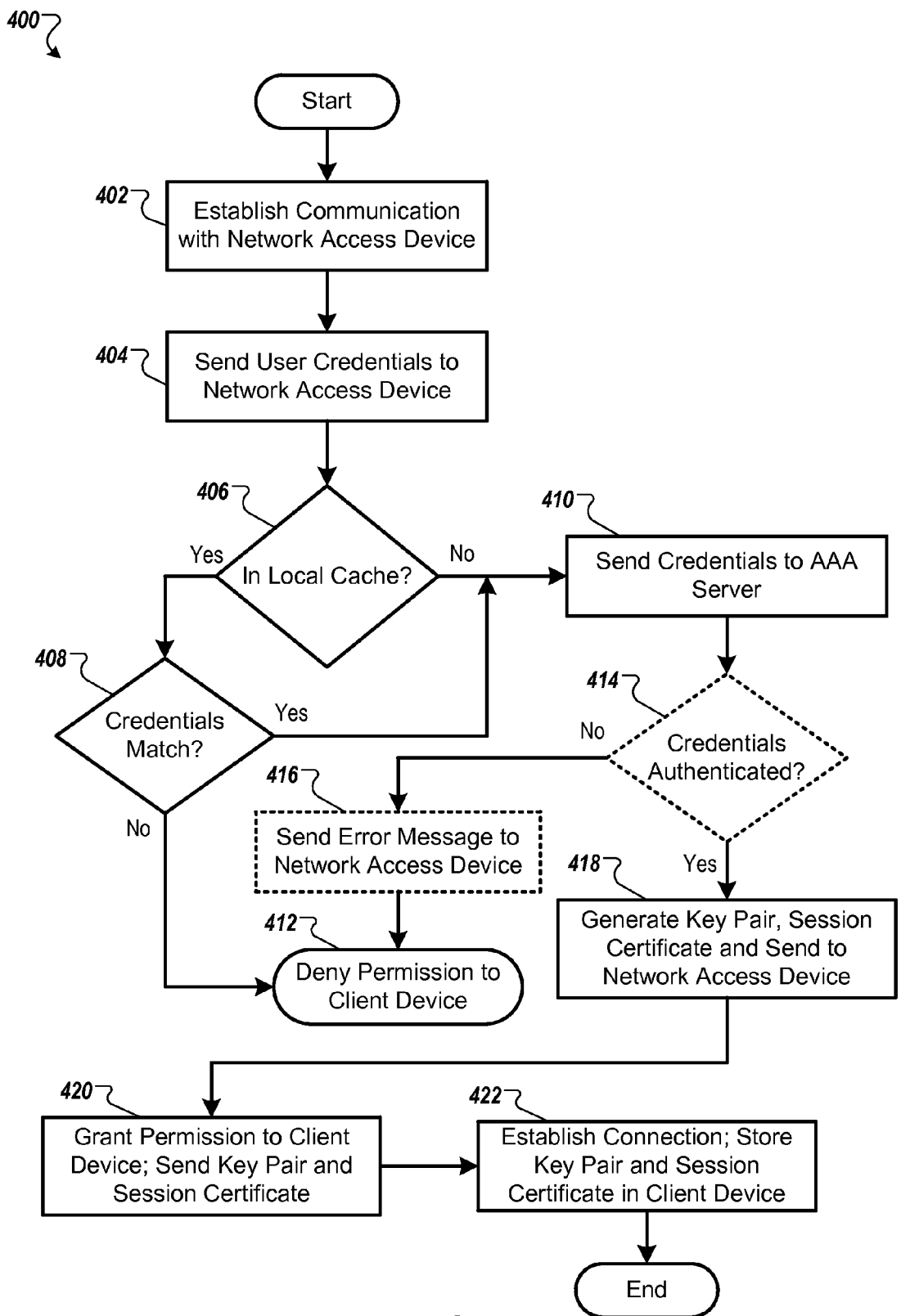
FIG. 4 is a flow chart illustrating an example of a process for providing a session certificate to a client device.

FIG. 4 is a flow chart illustrating an example of a process 400 for providing a session certificate to a client device. The process 400 may be performed by a client device, a network access device and an AAA server that exchange messages for enabling the client device to access a network associated with the network access device. For example, the process 400 may be performed by the client device 102, the network access device 104 and the AAA server 110 when the user of client device 102 wants to connect to network 106. The following describes the process 400 as being performed by components of the system 100. However, the process 400 may be performed by other systems or system configurations.

The process 400 is executed when the client device establishes communication with the network access device (402). For example, the client device 102 sends a connection request to the network access device 104 when the user of client device 102 wants to connect to network 106 for visiting the website hosted by web server 112 via the network 106.

The client device sends the user credentials to the network access device (404). For example, the client device 102 may prompt the user to enter credentials that are used for verifying the identity of the user to the network access device 104. Once the user enters the requested credentials, the client device 102 sends the user credentials to the network access device 104.

Upon receiving the user credentials from the client device, the network access device checks whether it has credentials corresponding to the user of client device 102 in its local cache (406). For example, the network access device may have previously received from the AAA server a copy of the credentials of the user of client device 102 as part of a past message exchange with client device 102.

If the network access device determines that it has the credentials in local cache, the network access device checks whether the credentials match (408). For example, the network access device 104 checks whether the credentials sent by the client device 102 matches the cached copy of the credentials received previously from the AAA server 110. On the other hand, if the network access device determines that it does not have the credentials in local cache, it sends the credentials to the AAA server (410). This may be the case, for example, when the user of client device 102 is requesting access to the network 106 for the first time. In this case, the network access device sends the credentials to the AAA server for verification and for generating the session certificate if the credentials are verified as correct.

If the credentials are available in local cache and do not match the credentials sent by the client device, the network access device denies permission to the client device (412) to establish a connection to the network. For example, if the credentials supplied by client device 102 are different from the credentials of the user cached by network access device 104, then the network access device 104 determines that the user of client device 102 cannot be authenticated and authorized to access the network 106. Consequently, the network access device 104 may send a connection rejection to the client device 102.

However, if the credentials are available in local cache and match the credentials sent by the client device, the network access device sends the credentials to the AAA server (410). In this case, the network access device sends the credentials to the AAA server for generating the session certificate. In some implementations, the network access device may include a flag with the message to the AAA server to indicate whether it has verified the credentials.

Upon receiving the credentials from the network access device, the AAA server determines whether the credentials are authenticated (414). For example, the AAA server 110 may check a flag that is included in the message from the network access device 104 to determine whether the network access device 104 has verified the credentials. A flag with a value "1" may indicate that the network access device 104 has verified the credentials and is requesting a session certificate from the AAA server 110. A flag with a value "0" may indicate that the network access device 104 has not verified the credentials and is requesting the AAA server 110 to verify the credentials and then generate the session certificate if the credentials are verified as correct.

If the AAA server 110 determines that the credentials have to be authenticated, the AAA server 110 may check whether the credentials sent by the network access device 104 matches the credentials corresponding to the user of client device 102 that is stored at the AAA server 110 as part of the registration information for the user. If the credentials do not match, then the AAA server sends an error message to the network access device (416). In addition, the AAA server may send a copy of the credentials that is stored in its database to the network access device. This may be the case, for example, when this is the first time that the user of the client device is being verified and consequently the network access device has not previously received a copy of the credentials for the user from the AAA server. Upon receiving the error message from the AAA server, the network access device denies permission to the client device to establish a connection to the network (412), as described previously.

In some implementations, the network access device sends the credentials to the AAA server 110 only if it is able verify the user, i.e., there is a match between credentials stored in its local cache with the credentials sent by the client device 102. In such implementations, the AAA server 110 does not have to check whether the credentials are authenticated (414) and does not have to send any error message to the network access device (416).

On the other hand, if the credentials are authenticated, then the AAA server generates a key pair and associated session certificate for the user and sends to the network access device (418). For example, the AAA server 110 generates a public/private key pair and a session certificate for the user of client device 102 that is tied to the key pair. The AAA server 110 sends the session certificate and the key pair to the network access device 104.

The network access device grants permission to the client device to access the network and sends the key pair and session certificate to the client device (420). For example, the network access device 104 sends a message to the client device 102 granting permission to access the network 106, along with the session certificate and the key pair. In one implementation, the message granting permission may be different from the message sending the key pair and session certificate. In other implementations, the same message may include information granting permission along with the key pair and session certificate.

The client device establishes connection to the network and stores the key pair and session certificate in local memory (422). For example, upon receiving permission from the network access device 104, the client device 102 connects to the network 106, that is, the resources in the network 106 allow the client device 102 to establish connections using the resources. In addition, the client device 102 stores the session certificate and key pair in local memory and makes the session certificate and key pair available to applications running on the client device 102 that may require the session certificate key pair, e.g., the web browser. The user of client device 102 may then access the contents of the website hosted by the web server 112.

Figure 5:
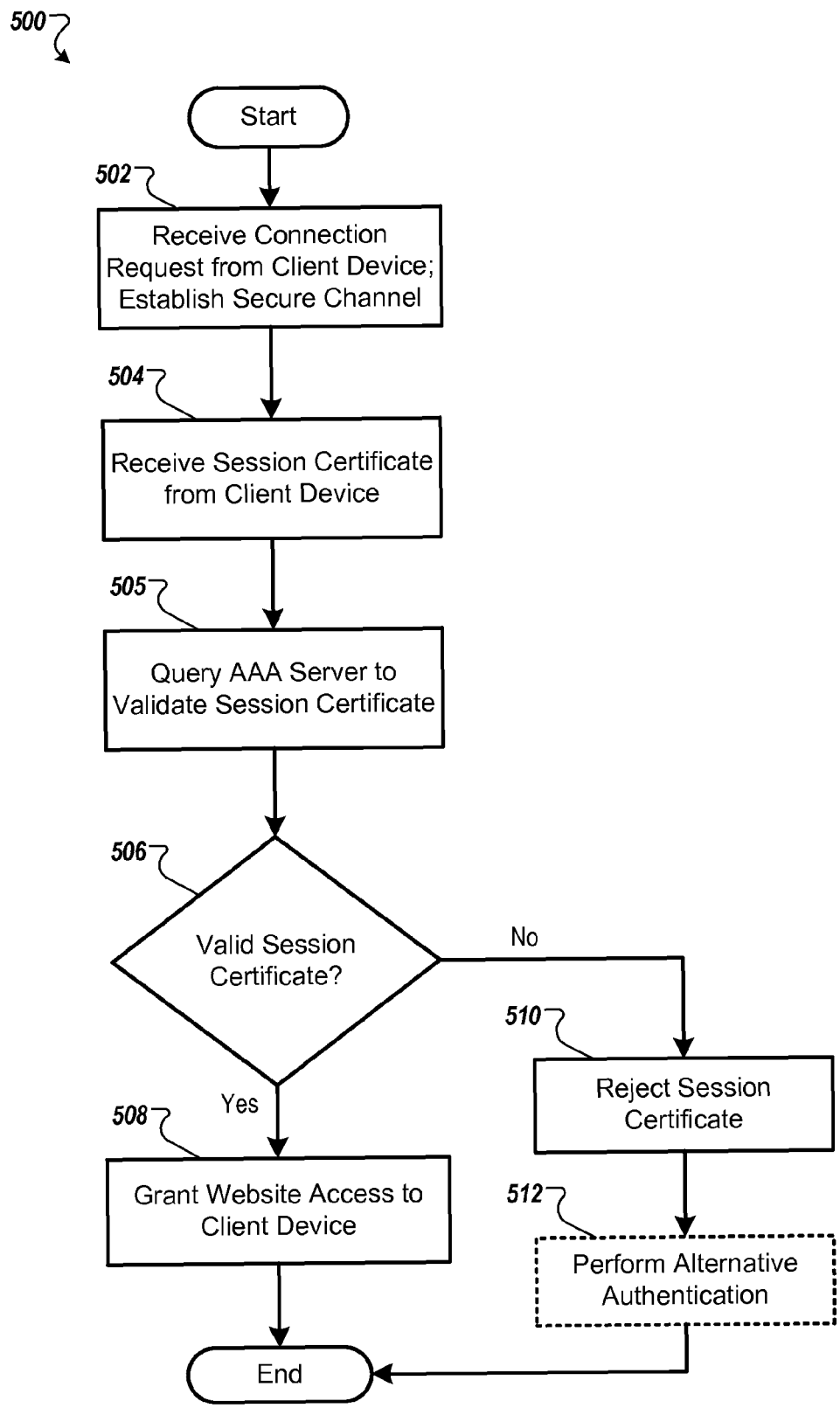
FIG. 5 is a flow chart illustrating an example of a process for authenticating a client device to a website based on a session certificate.

FIG. 5 is a flow chart illustrating an example of a process for authenticating a client device to a website based on a session certificate. The process 500 may be performed by a web server that is configured to process session certificates provided by a client device. For example, the process 500 may be performed by the web server 112 when the user of client device 102 attempts to access the website hosted by the web server 112. The following describes the process 500 as being performed by components of the system 100. However, the process 500 may be performed by other systems or system configurations.

The process 500 is executed when a web server receives a connection request from a client device and establishes a secure channel with the client device (502). For example, the web server 112 receives a request from the web browser on client device 102 for establishing an HTTPS connection to the web server 112. The request is made by the web browser when the user of client device 102 attempts to access the secure website hosted by the web server 112. The web server 112 accepts the connection request and performs a security handshake, e.g., an SSL or TLS handshake, with the web browser to validate and establish the HTTPS channel.

The web server receives the session certificate from the client device (504). For example, as part of the SSL handshake for establishing the HTTPS connection, the client device 102 sends the session certificate associated to the web server 112 to authenticate the user. Upon receiving the session certificate, the web server sends a query to an AAA server to validate the session certificate (505). For example, web server 112 determines from the session certificate sent by client device 102 that the AAA server 110 is the CA who generated the session certificate. The web server 112 sends a certificate validity query to the AAA server 110, e.g., using an OCSP message, to determine whether the session certificate is valid. The web server 112 sends the query when the pre-determined validity period indicated on the session certificate has not expired, but the session certificate may have become invalid due to some other reason, e.g., the session certificate may have been revoked by the AAA server 110. On the other hand, if the validity period indicated on the session certificate has expired, then the web server 112 determines, without querying the AAA server 110, that the session certificate is not valid.

The web server checks whether the session certificate is valid (506). For example, the web server 112 receives a response to its query from the AAA server 110 with information whether the session certificate is valid. Alternatively, as described in the preceding section, the web server 112 may check the validity period indicated on the session certificate to determine whether the certificate has expired, i.e., it is not valid.

If the web server determines that the session certificate is valid, the web server grants website access to the client device (508). For example, the web server 112 completes the security handshake with the web browser on the client device 102 and authenticates the user based on the session certificate as part of the security handshake. The user is then allowed to access the contents of the website hosted by the web server 112 without having to perform any other authentication for being allowed access.

However, if the web server determines that the session certificate is not valid, the web server rejects the session certificate (510). For example, if the response from the AAA server 110 informs the web server 112 that the session certificate is not valid, the web server 112 rejects the session certificate from the client device 102 and refuses the connection request from the web browser to access the website hosted by the web server 112.

However, in some implementations, after rejecting the session certificate as not valid, the web server proceeds to perform alternative authentication with the client device (512). For example, the web server 112 may complete the SSL handshake and establish the HTTPS connection without the session certificate. Then the web server 112 may verify the user based on web authentication, e.g., using a login username/password combination.

Figure 6:
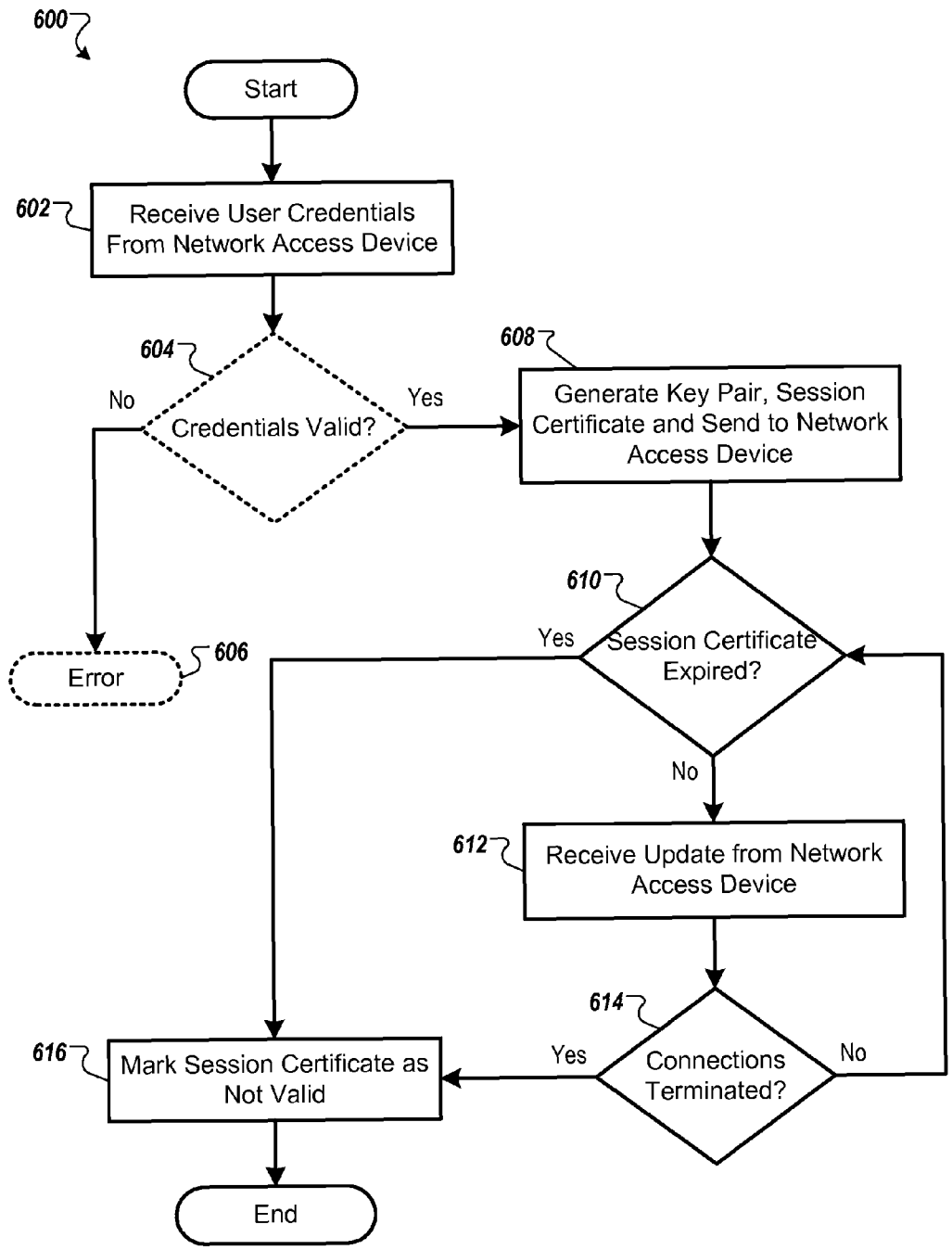
FIG. 6 is a flow chart illustrating an example of a process for generating and managing session certificates.

FIG. 6 is a flow chart illustrating an example of a process 600 for generating and managing session certificates. The process 600 may be performed by a CA that generates digital certificates for a network or security domain and maintains validity information for the certificates. For example, the process 600 may be performed by the AAA server 110 that acts the CA for the system 100. The following describes the process 600 as being performed by components of the system 100. However, the process 600 may be performed by other systems or system configurations.

The process 600 is executed when the CA receives user credentials from a network access device 104 (602). For example, the AAA server 110 receives from the network access device 104 credentials associated with the user of client device 102 when the client device 102 requests a connection to the network 106. Upon receiving the credentials, the CA determines whether the credentials are valid (604). For example, the message received from the network access device 104 with the credentials of the user of client device 102 might include a request from the network access device 104 to verify the credentials sent with the message. This may be the case, for example, when the network access device 104 has not verified the credentials. As described previously, the network access device 104 may not verify the credentials for various reasons, e.g., this is the first request from the client device 102 such that the network access device 104 does not have a locally cached copy of the credentials of the user of client device 102.

If the CA determines that the credentials are not valid, the CA generates an error (606). For example, upon comparing the credentials sent by the network access device 104 with the corresponding user credentials that are stored in its database, the AAA server 110 may determine that the credentials do not match and therefore the credentials sent by the network access device 104 are not valid. Consequently, the AAA server 110 sends an error message to the network access device 104 indicating the credentials are not valid. In addition, the AAA server 110 also may send a copy of the user credentials that are stored in its database. This may allow the network access device 104 to verify the credentials of the user for future connection requests, thereby saving on the overhead of sending the credentials to the AAA server 110 for verification.

In some implementations, the verification of the credentials are done by the network access device 104 and the AAA server 110 is not involved. In such implementations, the CA does not check whether the credentials are valid (604) and consequently does not have to generate error (606) if the credentials are not valid.

On the other hand, if the credentials are determined to be valid, either by the network access device or the CA, then the CA generates a public/private key pair and associated session certificate and sends to the network access device (608). For example, the AAA server 110 generates a session certificate for the user of client device 102 that is tied to the credentials sent by the network access device 104. As part of generating the session certificate, the AAA server 110 generates a public/private key pair and ties the key pair to the session certificate. The AAA server 110 sends the session certificate and the key pair to the network access device 104, for transmission to the client device 102.

The CA checks whether a session certificate has expired (610). For example, the AAA server 110 periodically checks the lifetime of all the session certificates in its database to determine whether any session certificate has expired. The certificate expiry time that is indicated on each session certificate is stored in the database corresponding to each issued session certificate, as shown in column 312 of database 300. The AAA server 110 periodically checks which of the certificate expiry times are in the past compared to the time the check is performed. The corresponding session certificates are determined to have expired.

For session certificates that have not expired, the CA periodically receives updates from the network access device (612). For example, the AAA server 110 tracks the connections of various client devices to the network 106 using accounting messages that are sent by the network access device 104.

Based on the update messages received from the network access device, the CA determines whether the connections are terminated (614). For example, the accounting messages from the network access device 104 inform the AAA server 110 which of the connections of different client devices to the network 106 have terminated, e.g., the user of the corresponding client device may have closed the connection. For session certificates associated with connections that are still active, the CA continues checking whether the session certificates have expired (610), or whether the corresponding connections have terminated (614).

On the other hand, if the CA determines that a session certificate has expired, or the corresponding connection has been terminated, then the CA marks the session certificate as not valid (616). For example, upon checking the certificate expiry time corresponding to row entry 302 in the database 300, the AAA server 110 may determine that the certificate has expired and therefore mark the associated certificate certificate_A1 as not valid. Alternatively, the AAA server 110 may receive an accounting message from the network access device 104 with the information that the network connection session 1 for user A has been terminated. The AAA server 110 marks the associated certificate certificate_A1 as revoked, i.e., not valid, with the value "Y" in column 314 for the row entry 302 corresponding to <user A, session 1>. Consequently, when web server 112 sends a query to the AAA server 110 to know the validity of session certificate certificate_A1, the AAA server 110 sends a response to the web server 112 indicating that the session certificate certificate_A1 is not valid. However, if the web server 112 inquires about session certificate certificate_B or certificate_A2, for which the validity times have not expired and the network connections have not terminated, the AAA server 110 responds with the information that the session certificate certificate_B or certificate_A2 is still valid. Therefore, the web server 112 may authenticate the user associated with either session certificate certificate_B or certificate_A2 based on the session certificate.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   requesting, by a client device, permission from a network access device to access a network associated with the network access device;
   sending, from the client device, credentials of a user for authenticating with the network access device, wherein the user is associated with the client device;
   receiving, at the client device and from the network access device, permission to access the network along with a session certificate and an associated key, wherein the session certificate and the key are associated with the credentials of the user;
   based on receiving the permission, establishing, by the client device, a network session using the network;
   establishing, by the client device during the network session, a secure communications channel with a web server associated with a website;
   authenticating, using the client device, the user to the website by sending the session certificate to the web server over the secure communications channel; and
   based on information received at the web server from an authentication, authorization and accounting (AAA) server indicating that the session certificate is valid in response to the web server requesting the information from the AAA server, receiving, from the web server at the client device, permission from the website to access contents of the website,
   wherein the information received by the web server from the AAA server indicating that the session certificate is valid is based on information received at the AAA server from the network access device relating to the status of the network session, and
   wherein the request from the web server to the AAA server for information includes information on the session certificate.

2. The method of claim 1, wherein requesting permission from the network access device comprises:
   establishing communications, by the client device, with the network access device, using 802.1x protocol and an Extensible Authentication Protocol (EAP) method with a secure tunnel.

3. The method of claim 1, wherein the credentials of the user include a login user name and a user password associated with the login user name.

4. The method of claim 1, wherein the session certificate is a X.509 certificate.

5. The method of claim 1, wherein the session certificate is associated with the client device.

6. The method of claim 1, wherein the session certificate includes information on an expiration lifetime of the session certificate.

7. The method of claim 1, wherein the session certificate and the key are valid for a predetermined amount of time.

8. The method of claim 7, wherein the predetermined amount of time is a duration of the network session.

9. The method of claim 1, comprising:
   establishing the secure communications channel with the website using secure Hyper Text Transfer Protocol (HTTPS);
   sending the session certificate to the website as part of a Secure Socket Layer (SSL) handshake associated with the secure communications channel; and
   receiving permission from the website to access contents of the website based on the user being authenticated by the website using the session certificate.

10. The method of claim 1, comprising:
    receiving, by the network access device, a request from the client device to access the network associated with the network access device;
    receiving, by the network access device and from the client device, credentials of the user associated with the client device;
    sending, by the network access device, the credentials to the AAA server associated with the network;
    receiving, by the network access device and from the AAA server, a verification of the credentials along with the session certificate and the key that are associated with the credentials; and
    sending, by the network access device, permission to the client device to initiate the network session, along with the session certificate and the key.

11. The method of claim 10, wherein the AAA server is a certificate authority (CA) for the network associated with the network access device, and wherein the CA is recognized by websites that are accessible using the network.

12. The method of claim 1, comprising:
    establishing, by a web server associated with the website, the secure communications channel with the client device;
    receiving, by the web server and over the secure communications channel, the session certificate from the client device;
    determining, by the web server, whether the session certificate is valid; and
    based on determining that the session certificate is valid, granting, by the web server, permission to the client device to access the contents of the website.

13. The method of claim 12, wherein determining whether the session certificate is valid comprises:
    examining information on expiration lifetime included in the session certificate; and
    based on examining the information on expiration lifetime, determining whether the session certificate has expired.

14. The method of claim 1, further comprising:
based on the information from the AAA server indicating that the session certificate is not valid, denying, by the web server, permission to the client device to access the contents of the website.

15. The method of claim 1, wherein sending a request to the AAA server to validate the session certificate comprises:
sending an Online Certificate Status Protocol (OCSP) request to the AAA server including information on the session certificate.

16. The method of claim 1, further comprising:
based on the information from the network access device indicating that the network session is terminated, determining, by the AAA server, that the session certificate is not valid; and
responsive to receiving the request from the web server, sending, by the AAA server, information to the web server indicating that the session certificate is not valid.

17. The method of claim 1, wherein receiving information from the network access device on the status of the network session comprises:
receiving, by the AAA server, accounting messages from the network access device on the status of the network session established by the client device,
wherein the accounting messages are sent by the network access device using Remote Authentication Dial In User Service (RADIUS) accounting messages.

18. A system comprising:
a client device including instructions encoded in a non-transitory machine-readable first medium for execution by a first processor and operable to cause the first processor to perform functions including:
establishing communications with a network access device;
requesting permission from the network access device to access a network associated with the network access device;
sending credentials of a user for authenticating with the network access device, wherein the user is associated with the client device;
receiving, from the network access device, permission to access the network along with a session certificate and a key, wherein the session certificate and the key are associated with the user credentials;
based on receiving the permission, establishing a network session using the network;
establishing, during the network session, a secure communications channel with a web server associated with a website;
authenticating, using the client device, the user to the website by sending the session certificate to the web server over the secure communications channel; and
based on information received at the web server from an authentication, authorization and accounting (AAA) server indicating that the session certificate is valid in response to the web server requesting the information from the AAA server, receiving, from the web server at the client device, permission from the website to access contents of the website,
wherein the information received by the web server from the AAA server indicating that the session certificate is valid is based on information received at the AAA server from the network access device relating to the status of the network session, and
wherein the request from the web server to the AAA server for information includes information on the session certificate;
the network access device including instructions encoded in a non-transitory machine-readable second medium for execution by a second processor and operable to cause the second processor to perform functions including:
receiving a request from the client device to access the network associated with the network access device;
receiving, from the client device, credentials of the user associated with the client device;
sending the credentials to the AAA server associated with the network;
receiving, from the AAA server, a verification of the credentials along with the session certificate and the key that are associated with the credentials; and
sending permission to the client device to initiate the network access session, along with the session certificate and the key.

19. A computer program product, embodied in a non-transitory machine-readable medium and having instructions encoded therein, the instructions when executed by a processor cause the processor to perform functions including:
establishing communications, by a client device, with a network access device;
requesting, by the client device, permission from the network access device to access a network associated with the network access device;
sending, from the client device, credentials of a user for authenticating with the network access device, wherein the user is associated with the client device;
receiving, at the client device and from the network access device, permission to access the network along with a session certificate and a key, wherein the session certificate and the key are associated with the credentials of the user;
based on receiving the permission, establishing, by the client device, a network session using the network;
establishing, during the network session, a secure communications channel with a web server associated with a website;
authenticating, using the client device, the user to the website by sending the session certificate to the web server over the secure communications channel; and
based on information received at the web server from an authentication, authorization and accounting (AAA) server indicating that the session certificate is valid in response to the web server requesting the information from the AAA server, receiving, from the web server at the client device, permission from the website to access contents of the website,
wherein the information received by the web server from the AAA server indicating that the session certificate is valid is based on information received at the AAA server from the network access device relating to the status of the network session, and
wherein the request from the web server to the AAA server for information includes information on the session certificate.

* * * * *